US009112843B2

(12) United States Patent
Huang et al.

(10) Patent No.: US 9,112,843 B2
(45) Date of Patent: Aug. 18, 2015

(54) METHOD AND SYSTEM FOR SUBSCRIBER TO LOG IN INTERNET CONTENT PROVIDER (ICP) WEBSITE IN IDENTITY/LOCATION SEPARATION NETWORK AND LOGIN DEVICE THEREOF

(75) Inventors: Bing Huang, Shenzhen (CN); Hua Jiang, Shenzhen (CN); Qiang Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1 day.

(21) Appl. No.: 13/496,720
(22) PCT Filed: Sep. 9, 2010
(86) PCT No.: PCT/CN2010/076775
§ 371 (c)(1), (2), (4) Date: Mar. 16, 2012
(87) PCT Pub. No.: WO2011/032471
PCT Pub. Date: Mar. 24, 2011

(65) Prior Publication Data
US 2012/0180114 A1 Jul. 12, 2012

(30) Foreign Application Priority Data
Sep. 17, 2009 (CN) .............................. 2009 1 0174300

(51) Int. Cl.
G06F 7/04 (2006.01)
G06F 15/16 (2006.01)
(Continued)

(52) U.S. Cl.
CPC ............. *H04L 63/08* (2013.01); *H04L 63/0815* (2013.01)

(58) Field of Classification Search
CPC .................................................. H04L 63/0815
USPC ...................................................... 726/1–21
See application file for complete search history.

(56) References Cited

U.S. PATENT DOCUMENTS 7,237,025 B1 * 6/2007 Albert et al. ................... 709/225
2006/0080200 A1 * 4/2006 Ashton et al. .................... 705/35
(Continued)

FOREIGN PATENT DOCUMENTS

| CN | 1430377 A | 7/2003 |
|----|-----------|--------|
| CN | 1801764 A | 7/2006 |

(Continued)

OTHER PUBLICATIONS

International Search Report for PCT/CN2010/076775 Dated Dec. 16, 2010.

*Primary Examiner* — Andrew Nalven
*Assistant Examiner* — Khang Do
(74) *Attorney, Agent, or Firm* — Banner & Witcoff, Ltd.

(57) ABSTRACT

The present invention provides a method and system for a user to log in an Internet Content Provider (ICP) website in an identification location separation network and a login device thereof. The method includes: after receiving an access data packet of a user, the ICP website obtaining an identification code of the user therein, and transmitting the identification code of the user to an Internet Service Provider (ISP) authentication center; the ISP authentication center authenticating the user based on the identification code of the user, and if the authentication is passed, the ISP authentication center returning an authentication passed message, which contains the identification code of the user, to the ICP website; after receiving the authentication passed message, the ICP website obtaining personal information of the user according to the identification code of the user, and then the user logging in the ICP website.

13 Claims, 2 Drawing Sheets (51) Int. Cl.
  *G06F 17/30*  (2006.01)
  *H04L 29/06*  (2006.01)

(56) References Cited

U.S. PATENT DOCUMENTS

| | | | |
|---|---|---|---|
| 2006/0129817 A1* | 6/2006 | Borneman et al. | 713/170 |
| 2006/0136298 A1* | 6/2006 | Klein et al. | 705/14 |
| 2007/0056022 A1* | 3/2007 | Dvir | 726/4 |
| 2008/0060064 A1* | 3/2008 | Wynn et al. | 726/5 |
| 2008/0178264 A1* | 7/2008 | Keohane et al. | 726/3 |
| 2008/0214310 A1* | 9/2008 | Brunet De Courssou et al. | 463/42 |
| 2010/0011421 A1* | 1/2010 | Chari et al. | 726/5 |

FOREIGN PATENT DOCUMENTS

| | | |
|---|---|---|
| CN | 1805335 A | 7/2006 |
| CN | 101189827 A | 5/2008 |
| JP | 9319705 | 12/1997 |
| JP | 2001244927 A | 9/2001 |
| JP | 2002-041476 A | 2/2002 |
| JP | 2003036352 A | 2/2003 |
| JP | 2005209146 A | 8/2005 |
| JP | 2006-107360 A | 4/2006 |
| JP | 2006146799 A | 6/2006 |
| JP | 2007-183973 A | 7/2007 |
| JP | 2008134810 A | 6/2008 |
| JP | 2008152574 A | 7/2008 |
| JP | 2008312191 A | 12/2008 |
| JP | 2009134503 A | 6/2009 |

* cited by examiner

METHOD AND SYSTEM FOR SUBSCRIBER TO LOG IN INTERNET CONTENT PROVIDER (ICP) WEBSITE IN IDENTITY/LOCATION SEPARATION NETWORK AND LOGIN DEVICE THEREOF

TECHNICAL FIELD

The present invention relates to the field of mobile communication and the filed of Internet, and in particular, to a method and a system for a user to log in an Internet Content Provider (ICP) website in an identification location separation network and a login device thereof.

BACKGROUND ART

With the development of information technology, information network, with the Internet being the representative, has played more and more important function in the economic and social development. The status of Internet in the people's life also becomes more and more important.

There are two kinds of enterprises providing Internet services for people: one is called as Internet Service Provider (ISP), which owns network resources, and provides Internet access service for the users by various accessing ways, such as Asymmetric Digital User Line (ADSL), 3rd-Generation (3G), Ethernet and Wireless Local Area Network (WLAN), and so on, for example, all basic telecommunication operators, such as China Telecom and China Mobile, belong to this kind of Internet service provider; another kind is called as Internet Content Provider (ICP), which opens various kinds of websites on the Internet, and provides various Internet services, such as news, Email, game, search, chat and so on, for people, and enterprises, such as Sina, Tencent, Baidu and so on, all belong to this kind of Internet service provider.

In the related art, Transmission Control Protocol/Internet Protocol (TCP/IP) is the basic protocol of the Internet, which is divided into five layers and whose protocol stack is as shown in Table 1. Wherein, the most crucial is the IP protocol for the network layer, and access between users is achieved through the IP address; TCP and UDP respectively provide two communication modes, namely, connection-oriented and non-connection-oriented; the protocol in the application layer provides users with various specific services, such as WEB access (HTTP), EMAIL service, Voice over IP (VOIP) service (based on SIP), and so on.

TABLE 1

| | |
|---|---|
| Application layer | HTTP (HyperText Transfer Protocol), EMAIL, S IP (Session Initiation Protocol), etc. |
| Transmission layer | TCP, UDP (User Datagram Protocol ) |
| Network layer | IP |
| Link layer | Ethernet, ATM (Asynchronous Transfer Mode), 3G link, etc. |
| Physical layer | Fiber, cable, radio wave, etc. |

Based on the above network structure, the ISP authentication center needs to authenticate the user when the user accesses the internet. For example, in the ADSL accessing mode, the ISP authentication center provides a user name and a password for the user in advance, and after the user enters the user name and the password on the terminal, the ISP authentication center authenticates the user and then distributes to the user an IP address. The user accesses various services in the Internet afterwards through this IP address, and this IP address is analogous to a temporary identification of the user. Similarly, in a mobile network, an ISP authentication center (e.g. China Mobile) will distribute to each user a User Identification Module (SIM) card, which is to be inserted into the mobile phone, and when the user accesses the internet, the ISP authentication center authenticates the user according to the International Mobile User Identification (IMSI) information on the SIM card. After authentication is passed, an IP address is also distributed to the user.

Since an IP address has dual attributes, namely, identification attribute and location attribute, the IP address cannot be used as a long-term identification identifier of the user. The reasons are: on one hand, the IP address is the identification attribute of the user, and on the other hand, the IP address is the location attribute of the user, wherein, the IP address prefix of the user indicates the sub-network where the user is currently in, so after the location of the user changes, a different address must be distributed, otherwise, the router cannot forward data packets correctly to the user. Therefore, in the current Internet, the IP address distributed to the user by the ISP authentication center is not fixed every time the user accesses the Internet.

Just because the IP address distributed to the user by the ISP is not necessarily the same, the ICP must establish a set of user identification identifying system by itself in order to identify the identification of the user. The ICP website identifies the user in two steps, the first being registration, and the second being login. A user sets by himself a user name (must not overlap with existing user names) and a password during registration, and enters other personal information, such as date of birth, gender, telephone number, E mail address, occupation, hobby, etc. The ICP website stores this information in its own database, and registration of the user is completed. When the users logs in, the ICP website will require the user to enter a user name and a password, and the user may access various services of the ICP website after authentication is passed.

As can be seen, in the existing Internet, there are two authentications for a user to access an ICP website: the ISP authentication center implements an authentication for the user to access the Internet, and the ICP website implements another authentication for the user to visit its website. Since the user usually needs to visit a plurality of websites and an authentication is needed every time the user visits an ICP website, there are actually a plurality of authentications. Plural authentications cause big inconvenience to the user to access the Internet, for example: the user name and password can be easily forgotten; if the user visits the website for the first time, the user needs to register before visiting, even if the user visits this website for only one time. Moreover, for the ICP website, it is very costly to establish a user identifying system by itself.

Currently, the mobility and security problem caused by the defect of dual attributes of the IP address has become a bottleneck for further development of the Internet. In order to solve this problem, study is being made in the industry on a plurality of next-generation network technologies based on an identification location separation network, such as Locator/Identifier Separation Protocol (LISP), Host Identity Protocol (HIP), Six/one, integrated network and so on. The common feature of these technologies is that two coding spaces are incorporated: an identification code indicating the identification of the user, and a location code indicating the location of the user. Therefore, each user has both an identification code and a location code. The upper-layer service connection such as TCP and UDP establishes a communication connection with the opposite end based on the identification code of the user. When the user moves, the location code of the user also changes, but the identification code of the user keeps unchanged. Therefore, movement of the user will not cause interruption of the upper-layer service.

The protocol stack based on an identification location separation network is as shown in Table 2.

TABLE 2

| Application layer | HTTP, EMAIL, S IP, e tc. |
|---|---|
| Transmission layer | TCP, UDP |
| Network layer | Identification code or IP |
| Link layer | Ethernet, A TM, 3G link, etc. |
| Physical layer | Fiber, c able, radio wave, etc. |

After the identification code and the location code of the user are separated, a fixed identification code can be distributed to each user. When the user accesses the Internet, the ISP authentication center authenticates the user, and after authentication is passed, the ISP authentication center finds out in the database the identification code distributed to the user in advance and issues it to the user to use, and this identification code is the identification identifier of the user when accessing the Internet. In this scheme, the distributed identification code every time the user accesses the Internet is the same.

However, in the current technology of identification location separation network, the identification code of the user is only used for identification of the user in the network layer, i.e., the ISP authentication center uses this identification code for identification of the user accessing the Internet. While the ICP website still establishes by itself a set of identification identifying system. The user still needs to firstly register before login when visiting an ICP website. The problem of plural authentications when the user accesses Internet is still not solved, which limits the launch of new services.

SUMMARY OF THE INVENTION

The technical problem to be solved in the present invention is to provide a method and a system for a user to log in an Internet Content Provider (ICP) website in an identification location separation network and a login device to avoid the trouble of plural registrations and authentications when the user visits an ICP website.

In an identification location separation network, the user has an identification code indicating his identification, and the identification code of user is distributed by the ISP authentication center, but the identification code of the user is not used for the authentication of the user by the ICP website in the existing identification location separation network, and the user still needs to register and log in when visiting an ICP website. The present invention provides a method of a user logging in an ICP website using his identification code in an identification location separation network.

In order to solve the problem, the present invention provides a method for a user to log in an Internet Content Provider (ICP) website in an identification location separation network, comprising the following steps of:

after receiving an access data packet of a user, the ICP website obtaining an identification code of the user in the data packet, and transmitting the identification code of the user to an Internet Service Provider (ISP) authentication center;

the ISP authentication center authenticating the user based on the identification code of the user, and if the authentication is passed, the ISP authentication center returning an authentication passed message, which contains the identification code of the user, to the ICP website;

after receiving the authentication passed message, the ICP website obtaining personal information of the user according to the identification code of the user, and then the user logging in the ICP website.

Preferably, the above method is also characterized in that:

the personal information of the user comprises universal personal information and service-related personal information; wherein, the service-related personal information is information generated when the user uses the ICP website;

the universal personal information is information of the user stored in the ISP authentication center unrelated with services.

Preferably, the above method is also characterized in that:

the universal personal information comprises one or more of name, gender, date of birth, degree, telephone number, Email address and family address information.

Preferably, the above method is also characterized in that:

the service-related personal information comprises one or more of points obtained by the user, virtual money, temporally stored products, order recording, search recording and user level information.

Preferably, the above method is also characterized in that:

the step of the ISP authentication center authenticating the user based on the identification code of the user specifically comprises the following steps:

after receiving an authentication request sent by an ICP website, the ISP authentication center searching a database in the ISP authentication center using the identification code of the user carried in the authentication request as a keyword, and if user information corresponding to the identification code of the user is obtained, the authentication being passed.

Preferably, the above method is also characterized in that:

the authentication passed message sent by from the ISP authentication center to the ICP website further comprises the universal personal information of the user;

the step of the ICP website obtaining personal information of the user according to the identification code of the user specifically comprises:

after receiving the authentication passed message, the ICP website querying the service-related personal information of the user in the database of the ICP website according to the identification code of the user, and combining the universal personal information and the service-related personal information of the user into the personal information of the user.

Preferably, the above method is also characterized in that:

the step of the ICP website obtaining personal information of the user according to the identification code of the user specifically comprises:

the ICP website sending a query request message to the ISP authentication center to query the universal personal information of the user;

the ICP website querying the service-related personal information of the user in the database of the ICP website according to the identification code of the user;

after receiving the universal personal information of the user sent by the ISP authentication center, the ICP website combining the universal personal information and the service-related personal information of the user into the personal information of the user.

Preferably, the above method is also characterized in that:

if the ICP website cannot find the service-related personal information of the user in the local database, the ICP website locally generates service-related personal information of the user.

In order to solve the problem, the present invention provides a system for a user to log in an Internet Content Provider (ICP) website in an identification/location separation network, comprising a user, the ICP website and an Internet Service Provider (ISP) authentication center, wherein, the user is configured to send to the ICP website a visit data packet carrying an identification code of the user;

the ICP website is configured to obtain the identification code of the user in the visit data packet, and send the identification code of the user to the ISP authentication center; and after receiving an authentication passed message sent by the ISP authentication center, obtain personal information of the user, and complete login of the user;

the ISP authentication center is configured to receive the identification code of the user sent by the ICP website, and authenticate the user through the identification code of the user; and return the authentication passed message to the ICP website after the authentication is passed.

Preferably, the above system is also characterized in that:

the personal information of the user comprises universal personal information and service-related personal information; wherein, the universal personal information is information of the user stored in the ISP authentication center unrelated with services, and comprises one or more of name, gender, date of birth, degree, telephone number, Email address and family address information;

the service-related personal information is information generated when the user uses the ICP website, and comprises one or more of points obtained by the user, virtual money, temporally stored products, order recording, search recording and user level information.

In order to solve the above problem, the present invention further provides a login device, applied in an Internet Content Provider (ICP) website, the login device comprising an identification code obtaining unit and a user information obtaining unit, wherein:

the identification code obtaining unit is configured to obtain an identification code of a user in a visit data packet, and send the identification code of the user to an Internet Service Provider (ISP) authentication center;

the user information obtaining unit is configured to, after receiving an authentication passed message of the user sent by the ISP authentication center, obtain personal information of the user, and complete login of the user.

Preferably, the above device is also characterized in that:

the personal information of the user comprises universal personal information and service-related personal information;

the user information obtaining unit is configured to obtain the universal personal information of the user from the authentication passed message of the user sent by the ISP authentication center; and, after receiving the authentication passed message, query the service-related personal information of the user in a database of the ICP website according to the identification code of the user, and combine the universal personal information and the service-related personal information of the user into the personal information of the user.

Preferably, the above device is also characterized in that:

the user information obtaining unit is configured to, after receiving the authentication passed message, send a query request message to the ISP authentication center to query the universal personal information of the user, and query the service-related personal information of the user in the database of the ICP website according to the identification code of the user, combine the universal personal information and the service-related personal information of the user into the personal information of the user.

Preferably, the above device is also characterized in that:

the user information obtaining unit is configured to, if the service-related personal information of the user cannot be found in the ICP website, locally generate service-related personal information of the user.

By the above method, system and device, when accessing the Internet, a user can access all kinds of ICP websites using the identification code distributed by the ISP authentication center after passing only one authentication in the ISP authentication center without the necessity of another authentication, which facilitates not only the user but also the ICP website.

PREFERRED EMBODIMENTS OF THE INVENTION

The specific embodiments of the present invention will be described below with reference to the drawings.

Figure 1:
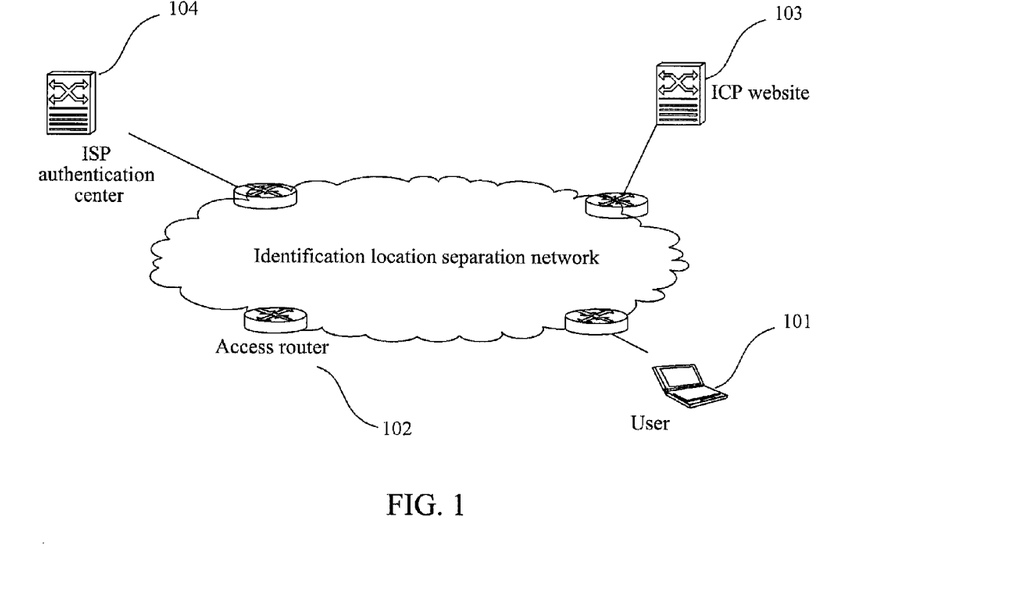
FIG. 1 is a schematic diagram of a user logging in an ICP website using his identification code according to an example of the present invention.

FIG. 1 illustrates a user logging in an ICP website using his identification code according to one example. In this example, the data packet of a user 101 for visiting an ICP website (through an access router 102) comprises the identification code of the user, and the ICP website 103 sends the identification code to an ISP authentication center 104 for authenticating the user, and if the authentication implemented by the ISP authentication center 104 on the user according to the identification code is passed, the ISP authentication center 104 returns the universal personal information of the user to the ICP website 103, and then the ICP website 103 searches for the service-related personal information of the user in a local database, after which, the user 101 completes logging in the ICP website.

Wherein, the action of the user 101 logging in the ICP website 103 here comprises the ICP website 103 identifying the identification of the user and obtaining the personal information of the user.

Wherein, the personal information of the user comprises the universal personal information and service-related personal information of the user.

The universal personal information of the user is unrelated with specific services and is stored in the ISP authentication center 104, comprising one or more of name, gender, date of birth, degree, telephone number, Email address and family address information, and the ICP website 103 can query the universal personal information of the user from the ISP authentication center 104 by signing an agreement (a cooperation agreement between the ISP authentication center 104 and the ICP website 103) with the ISP authentication center 104 in advance.

The service-related personal information of the user is the information generated when the user 101 uses this ICP website 103, comprising one or more of points and virtual money obtained by the user, temporality stored products, order recording, search recording and user level information, and this kind of information is generally stored by the ICP website 103 itself.

Figure 2:
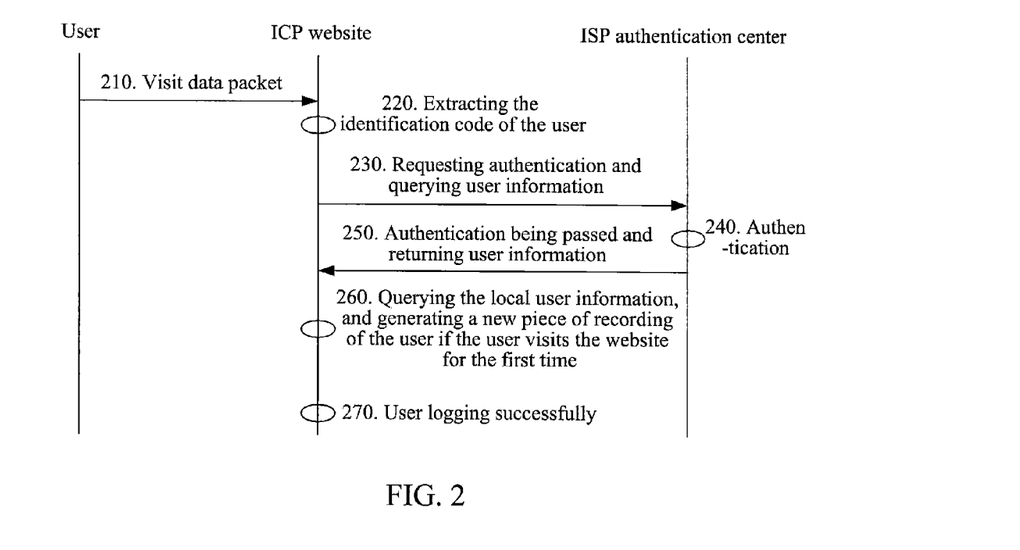
FIG. 2 is a flowchart of a user logging in an ICP website according to an example of the present invention.

FIG. 2 illustrates a user logging in an ICP website according to the above method, which specifically comprises the following steps.

Step 210, a user sends to an ICP website a visit data packet carrying an identification code of the user in an identification location separation network.

Step 220, after receiving the visit data packet of the user, the ICP website extracting the identification code of the user from the visit data packet.

Step 230, the ICP website initiating an authentication request to an ISP authentication center, wherein the authentication request contains the identification code of the user.

Step 240, after receiving the authentication request sent by the ICP website, the ISP authentication center authenticating the user by using the identification code of the user therein.

Wherein, the user can be authenticated in the following way.

When authenticating the user, the ISP authentication center searches a database in the ISP authentication center using the identification code of the user as a keyword;

if user information corresponding to the identification code of the user is found, authentication is passed, and execute step 250;

otherwise, the authentication is not passed, the ISP authentication center returns an authentication un-passed message to the ICP website, and end.

Step 250, after the authentication is passed, the ISP authentication center sends an authentication passed message containing the identification code of the user to the ICP website.

In this step, the authentication passed message sent from the ISP authentication center to the ICP website may further comprise the universal personal information of the user.

Step 260, after receiving the authentication passed message, the ICP website queries the service-related personal information of the user in the local database according to the identification code of the user in the authentication passed message, and combining the universal personal information and the service-related personal information of the user into complete personal information of the user.

In this step, if the authentication passed message received by the ICP website does not comprise the universal personal information of the user, the ICP website sends a query request message to the ISP authentication center to query the universal personal information of the user; after receiving the universal personal information of the user sent by the ISP authentication center, the ICP website combines the universal personal information and the service-related personal information of the user into complete personal information of the user;

if the ICP website cannot find the service-related personal information of the user in the local database after receiving the authentication passed message, it means that the user visits this website for the first time, and the ICP website locally generates service-related personal information of the user.

Step 270, the process of the user logging in the ICP website is completed.

Correspondingly, the present invention further provides a system for a user to log in an Internet Content Provider (ICP) website in an identification location separation network, comprising a user, the ICP website and an ISP authentication center, wherein, the user is configured to send to the ICP website a visit data packet carrying an identification code of the user;

the ICP website is configured to obtain the identification code of the user in the visit data packet, and send the identification code of the user to the ISP authentication center; and after receiving an authentication passed message sent by the ISP authentication center, obtain personal information of the user, and complete login of the user;

the ISP authentication center is configured to receive the identification code of the user sent by the ICP website, and authenticate the user through the identification code of the user; and return the authentication passed message to the ICP website after the authentication is passed.

Wherein, the personal information of the user comprises universal personal information and service-related personal information;

the universal personal information comprises one or more of name, gender, date of birth, degree, telephone number, Email address and family address information;

the service-related personal information is information generated when the user uses the ICP website, and comprises one or more of points obtained by the user, virtual money, temporality stored products, order recording, search recording and user level information.

Preferably, the ISP authentication center is configured to, after receiving an authentication request sent by an ICP website, search a database in the ISP authentication center using the identification code of the user carried in the authentication request as a keyword, and if user information corresponding to the identification code of the user is obtained, pass the authentication.

Preferably, the ICP website is configured to obtain the universal personal information of the user from the authentication passed message of the user sent by the ISP authentication center; and, after receiving the authentication passed message, query the service-related personal information of the user in the local database according to the identification code of the user, and combine the universal personal information and the service-related personal information of the user into the personal information of the user.

Preferably, the ICP website is configured to, after receiving the authentication passed message, send a query request message to the ISP authentication center to query the universal personal information of the user, and query the service-related personal information of the user in the database of the ICP website according to the identification code of the user, combine the universal personal information and the service-related personal information of the user into the personal information of the user.

Preferably, the ICP website is configured to locally generate service-related personal information of the user, if the service-related personal information of the user cannot be found in the ICP website.

Figure 3:
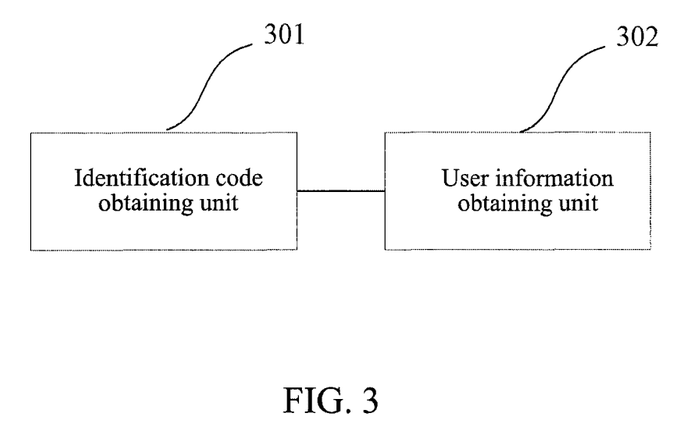
FIG. 3 is a schematic diagram of the login device according to an example of the present invention.

As shown in FIG. 3, the login device according to the example of the present invention, applied in an Internet Content Provider (ICP) website, comprises an identification code obtaining unit 301 and a user information obtaining unit 302, wherein:

the identification code obtaining unit 301 is configured to, obtain an identification code of a user in a visit data packet, and send the identification code of the user to an Internet Service Provider (ISP) authentication center;

the user information obtaining unit 302 is configured to, after receiving an authentication passed message of the user sent by the ISP authentication center, obtain personal information of the user, and complete login of the user.

Preferably, the user information obtaining unit 302 is configured to obtain the universal personal information of the user from the authentication passed message of the user sent by the ISP authentication center; and, after receiving the authentication passed message, query the service-related personal information of the user in a database of the ICP website according to the identification code of the user obtained from the identification code obtaining unit 301, and combine the universal personal information and the service-related personal information of the user into personal information of the user.

Preferably, the user information obtaining unit 302 is configured to, after receiving the authentication passed message, send a query request message to the ISP authentication center to query the universal personal information of the user, query the service-related personal information of the user in the database of the ICP website according to the identification code of the user obtained from the identification code obtaining unit 301, and combine the universal personal information and the service-related personal information of the user into the personal information of the user.

Preferably, the user information obtaining unit 302 is configured to, if the service-related personal information of the user cannot be found in the database of the ICP website, locally generate service-related personal information of the user.

A person having ordinary skill in the art can appreciate that all or part of the steps in the above step can be implemented by instructing related hardware through a program, which may be stored in a computer readable storage medium, such as read-only memory, disk or an optical disk, and so on. Optionally, all or part of the steps in the above examples can be also implemented using one or more integrated circuits. Correspondingly, each module/unit in the above examples can be implemented in the form of hardware, or in the form of software functional module. The present invention is not limited to any specific form of combination of hardware and software.

Although the present invention is described with reference to particular examples, a person having ordinary skill in the art can make modifications and transformations without departing from the spirit or scope of the present invention. Such modifications and transformations, however, shall be regarded as within the scope of the description and the scope of the attached claims.

INDUSTRIAL APPLICABILITY

The method and system for a user to log in an ICP website in an identification location separation network and a login device thereof provided in the present invention enables a user, when accessing the Internet, to access all kinds of ICP websites using the identification code distributed by the ISP authentication center after passing only one authentication in the ISP authentication center without the necessity of another authentication, which facilitates not only the user but also the ICP website.

What is claimed is:

1. A method for a user to log in to an Internet Content Provider (ICP) web site, comprising:
   in an identification location separation network, an Internet Service Provider (ISP) authentication center assigning to a user a fixed identification code to be used at a network layer during establishing a Transmission Control Protocol (TCP) or User Datagram Protocol (UDP) service connection;
   the ISP authentication center authenticating the user when the user accesses the Internet, and after the authentication is passed, the ISP authentication center sending to the user the fixed identification code which is assigned to the user in advance; wherein the ISP authentication center which assigns the fixed identification code to the user also stores universal personal information of the user, the universal personal information is unrelated with services;
   when the ICP website receives a visit data packet of the user, the ICP website obtaining the identification code of the user in the visit data packet, and transmitting the identification code of the user to the ISP authentication center;
   after receiving the identification code of the user from the ICP website, the ISP authentication center searching a database in the ISP authentication center using the identification code of the user as a keyword, when user information corresponding to the identification code of the user is found, the ISP authentication center sending an authentication passed message, which contains the identification code of the user and the universal personal information of the user, to the ICP website; thereby said fixed identification code of the user is used both for identifying the user at the network layer and for acquiring the universal personal information of the user from the ISP authentication center when the user accesses the ICP website; and
   after receiving the authentication passed message, the ICP website querying service-related personal information of the user in a database of the ICP website according to the identification code of the user in the authentication passed message, and the ICP website combining the universal personal information of the user received from the ISP authentication center and the service-related personal information of the user obtained from the database of the ICP website into complete personal information of the user and then the user logging in to the ICP website;
   thereby allowing the user to access all kinds of ICP websites using the fixed identification code distributed by the ISP authentication center after passing only one authentication in the ISP authentication center without a need of another authentication.

2. The method according to claim 1, wherein, the service-related personal information is information generated when the user uses the ICP website.

3. The method according to claim 1, wherein, the universal personal information comprises one or more of name, gender, date of birth, degree, telephone number, Email address and family address information.

4. The method according to claim 1, wherein, the service-related personal information comprises one or more of points obtained by the user, virtual money, temporally stored products, order recording, search recording and user level information.

5. The method according to claim 1, wherein: the ICP website obtaining the identification code of the user comprises sending a query request message to the ISP authentication center to query the universal personal information of the user.

6. The method according to claim 1, wherein, in the step of the ICP website querying the service-related personal information of the user in the database of the ICP website according to the identification code of the user, if the ICP website cannot find the service-related personal information of the user in the database of the ICP website, the ICP website locally generates the service-related personal information of the user.

7. The method according to claim 5, wherein,
in the step of the ICP website querying the service-related personal information of the user in the database of the ICP website according to the identification code of the user, if the ICP website cannot find the service-related personal information of the user in the database of the ICP website, the ICP website locally generates the service-related personal information of the user.

8. A system for a user to log in to an Internet Content Provider (ICP) website, comprising a user equipment, the ICP website and an Internet Service Provider (ISP) authentication center in an identification location separation network, wherein,
the ISP authentication center is configured to assign to the user a fixed identification code to be used at a network layer during establishing a Transmission Control Protocol (TCP) or User Datagram Protocol (UDP) service connection, authenticate the user when the user accesses the Internet, and after the authentication is passed, send to the user equipment the fixed identification code which is assigned to the user in advance; the ISP authentication center is further configured to store universal personal information of the user, wherein the universal personal information is unrelated with services;
the user equipment is configured to send to the ICP website a visit data packet carrying the identification code of the user;
the ICP website is configured to, when receiving the visit data packet of the user, obtain the identification code of the user in the visit data packet, and transmit the identification code of the user to the ISP authentication center;
the ISP authentication center is further configured to, after receiving the identification code of the user from the ICP website, search a database in the ISP authentication center using the identification code of the user as a keyword, when user information corresponding to the identification code of the user is found, send an authentication passed message, which contains the identification code of the user and the universal personal information of the user, to the ICP website; thereby said fixed identification code of the user is used both for identifying the user at the network layer and for acquiring the universal personal information of the user from the ISP authentication center when the user accesses the ICP website;
the ICP website is further configured to, after receiving the authentication passed message from the ISP authentication center, query service-related personal information of the user in a database of the ICP website according to the identification code of the user in the authentication passed message, and combine the universal personal information of the user received from the ISP authentication center and the service-related personal information of the user obtained from the database of the ICP website into complete personal information of the user, and complete login of the user;
thereby allowing the user to access all kinds of ICP websites using the fixed identification code distributed by the ISP authentication center after passing only one authentication in the ISP authentication center without a need of another authentication.

9. The system according to claim 8, wherein,
the universal personal information comprises one or more of name, gender, date of birth, degree, telephone number, Email address and family address information;
the service-related personal information is information generated when the user uses the ICP website, and comprises one or more of points obtained by the user, virtual money, temporally stored products, order recording, search recording and user level information.

10. A login device, applied in an Internet Content Provider (ICP) website, the login device comprising an identification code obtaining unit and a user information obtaining unit, and the login device being used in an identification location separation network, wherein:
the identification code obtaining unit is configured to, when receiving a visit data packet of a user, obtain the identification code of the user in the visit data packet, and transmit the identification code of the user to an ISP authentication center;
wherein the fixed identification code of the user is assigned by the ISP authentication center to the user to be used at a network layer during establishing a Transmission Control Protocol (TCP) or User Datagram Protocol (UDP) service connection, and after authentication of the user when the user accesses the Internet is passed, the ISP authentication center sends to the user the fixed identification code which is assigned to the user in advance; and the ISP authentication center which assigns the fixed identification code to the user also stores universal personal information of the user, the universal personal information is unrelated with services; after receiving the identification code of the user from the login device, the ISP authentication center searches a database in the ISP authentication center using the identification code of the user as a keyword, when user information corresponding to the identification code of the user is found, the ISP authentication center sends an authentication passed message, which contains the identification code of the user and the universal personal information of the user, to the login device; thereby said fixed identification code of the user is used both for identifying the user at the network layer and for acquiring the universal personal information of the user from the ISP authentication center when the user accesses the ICP website;
the user information obtaining unit is configured to, after receiving the authentication passed message from the ISP authentication center, obtain the universal personal information of the user from the authentication passed message, and query the service-related personal information of the user in a database of the ICP web site according to the identification code of the user, and combine the universal personal information received from the ISP authentication center and the service-related personal information of the user obtained from the database of the ICP website into complete personal information of the user, and complete login of the user;
thereby allowing the user to access all kinds of ICP websites using the fixed identification code distributed by the ISP authentication center after passing only one authentication in the ISP authentication center without a need of another authentication.

11. The device according to claim 10, wherein,
the obtaining the universal personal information of the user comprises sending a query request message to the ISP authentication center to query the universal personal information of the user.

12. The device according to claim 10, wherein,
the user information obtaining unit is configured to, if the service-related personal information of the user cannot be found in the database of the ICP website, locally generate service-related personal information of the user.

13. The device according to claim 11, wherein,
the user information obtaining unit is configured to, if the service-related personal information of the user cannot be found in the database of the ICP website, locally generate service-related personal information of the user.

\* \* \* \* \*